United States Patent
Takahashi

(10) Patent No.: US 12,173,193 B2
(45) Date of Patent: Dec. 24, 2024

(54) POLISHING AGENT FOR SYNTHETIC QUARTZ GLASS SUBSTRATE AND METHOD FOR POLISHING SYNTHETIC QUARTZ GLASS SUBSTRATE

(71) Applicant: SHIN-ETSU CHEMICAL CO., LTD., Tokyo (JP)

(72) Inventor: Mitsuhito Takahashi, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 903 days.

(21) Appl. No.: 16/765,040

(22) PCT Filed: Oct. 18, 2018

(86) PCT No.: PCT/JP2018/038758
§ 371 (c)(1),
(2) Date: May 18, 2020

(87) PCT Pub. No.: WO2019/097945
PCT Pub. Date: May 23, 2019

(65) Prior Publication Data
US 2020/0399504 A1    Dec. 24, 2020

(30) Foreign Application Priority Data
Nov. 17, 2017   (JP) ................. 2017-222254

(51) Int. Cl.
C09G 1/02       (2006.01)
B24B 37/04     (2012.01)
(Continued)

(52) U.S. Cl.
CPC .............. *C09G 1/02* (2013.01); *B24B 37/044* (2013.01); *C03C 19/00* (2013.01); *C09K 3/1409* (2013.01); *C09K 3/1454* (2013.01)

(58) Field of Classification Search
CPC .................................. C09G 1/00; C09G 1/02
See application file for complete search history.

(56) References Cited

U.S. PATENT DOCUMENTS 4,786,325 A    11/1988  Melard et al.
2004/0035153 A1  2/2004  Koike et al.
(Continued)

FOREIGN PATENT DOCUMENTS

CN    1789366 A    6/2006
CN    101469252 A    7/2009
(Continued)

OTHER PUBLICATIONS

Sep. 28, 2021 Office Action issued in Chinese Patent Application No. 201880074332.0.
(Continued)

*Primary Examiner* — Thomas T Pham
(74) *Attorney, Agent, or Firm* — Oliff PLC

(57) ABSTRACT

A polishing agent for a synthetic quartz glass substrate. The polishing agent contains wet ceria particles and non-spherical silica particles. The wet ceria particles have an average primary particle diameter of 30 nm to 50 nm. The non-spherical silica particles have an average primary particle diameter of 80 nm to 120 nm. This provides a polishing agent for a synthetic quartz glass substrate, the polishing agent having high polishing rate and being capable of sufficiently reducing generation of defects due to polishing.

4 Claims, 1 Drawing Sheet

(51) Int. Cl.
*C03C 19/00* (2006.01)
*C09K 3/14* (2006.01)

(56) References Cited

U.S. PATENT DOCUMENTS

| | | |
|---|---|---|
| 2008/0311487 A1 | 12/2008 | Ito et al. |
| 2008/0311750 A1 | 12/2008 | Izumi et al. |
| 2009/0179172 A1 | 7/2009 | Hirano et al. |
| 2010/0102268 A1 | 4/2010 | Kroell et al. |
| 2010/0163785 A1 | 7/2010 | Kroell et al. |
| 2010/0307068 A1 | 12/2010 | Kroell |
| 2013/0205682 A1* | 8/2013 | Ashitaka ............ C09K 3/1463 51/308 |
| 2014/0024216 A1 | 1/2014 | Stender et al. |
| 2014/0295738 A1 | 10/2014 | Matsui et al. |
| 2016/0068713 A1* | 3/2016 | Kitamura ................ C09G 1/04 252/79.1 |
| 2017/0014969 A1* | 1/2017 | Lam .......................... C09G 1/02 |
| 2017/0029664 A1* | 2/2017 | Park ................... H01L 21/31053 |
| 2017/0037290 A1 | 2/2017 | Takahashi |
| 2018/0079930 A1 | 3/2018 | Takahashi et al. |

FOREIGN PATENT DOCUMENTS

| | | |
|---|---|---|
| CN | 101611110 A | 12/2009 |
| CN | 101679809 A | 3/2010 |
| CN | 101818047 A | 9/2010 |
| CN | 101910352 A | 12/2010 |
| CN | 103896287 A | 7/2014 |
| CN | 103917332 A | 7/2014 |
| CN | 103992743 A | 8/2014 |
| CN | 104099025 A | 10/2014 |
| CN | 104178033 A | 12/2014 |
| CN | 104312441 A | 1/2015 |
| CN | 104428386 A | 3/2015 |
| CN | 106459732 A | 2/2017 |
| CN | 107010631 A | 8/2017 |
| JP | 863-027389 B2 | 6/1988 |
| JP | 2002-150548 A | 5/2002 |
| JP | 2004-098278 A | 4/2004 |
| JP | 2006-167817 A | 6/2006 |
| JP | 2007-213020 A | 8/2007 |
| JP | 2012-143845 A | 8/2012 |
| JP | 2012143845 * | 8/2012 |
| JP | 2015-063451 A | 4/2015 |
| JP | 2016-127139 A | 7/2016 |
| JP | 2017-155242 A | 9/2017 |
| TW | 200904956 A | 2/2009 |
| WO | 2016/181600 A1 | 11/2016 |
| WO | 2017/081835 A1 | 5/2017 |

OTHER PUBLICATIONS

Jul. 7, 2021 Office Action and Search Report issued in Chinese Patent Application No. 201880074332.0.
Jul. 13, 2021 Office Action issued in Japanese Patent Application No. 2017-222254.
Nov. 27, 2018 International Search Report issued in International Patent Application No. PCT/JP2018/038758.
May 19, 2020 International Preliminary Report on Patentability issued in International Patent Application No. PCT/JP2018/038758.
Niu, Xinhuan et al., "Research on the CMP Slurry for the Optical Quartz Glass", Micro-nanoelectronic Technology, vol. 53, No. 08, pp. 552-557, 2016.
Chen, Yang et al., "Preparation and Polishing Performance of CeO2@SiO2 Composite Abrasives", Material Guide, vol. 24, No. 18, pp. 35-38, 2010.
Feb. 2, 2021 Office Action issued in Japanese Patent Application No. 2017-222254.
Jan. 7, 2021 Chinese Office Action issued in Chinese Patent Application No. 201880074332.0.
May 18, 2023 Office Action issued in Korean Patent Application No. 10-2020-7013618.

* cited by examiner

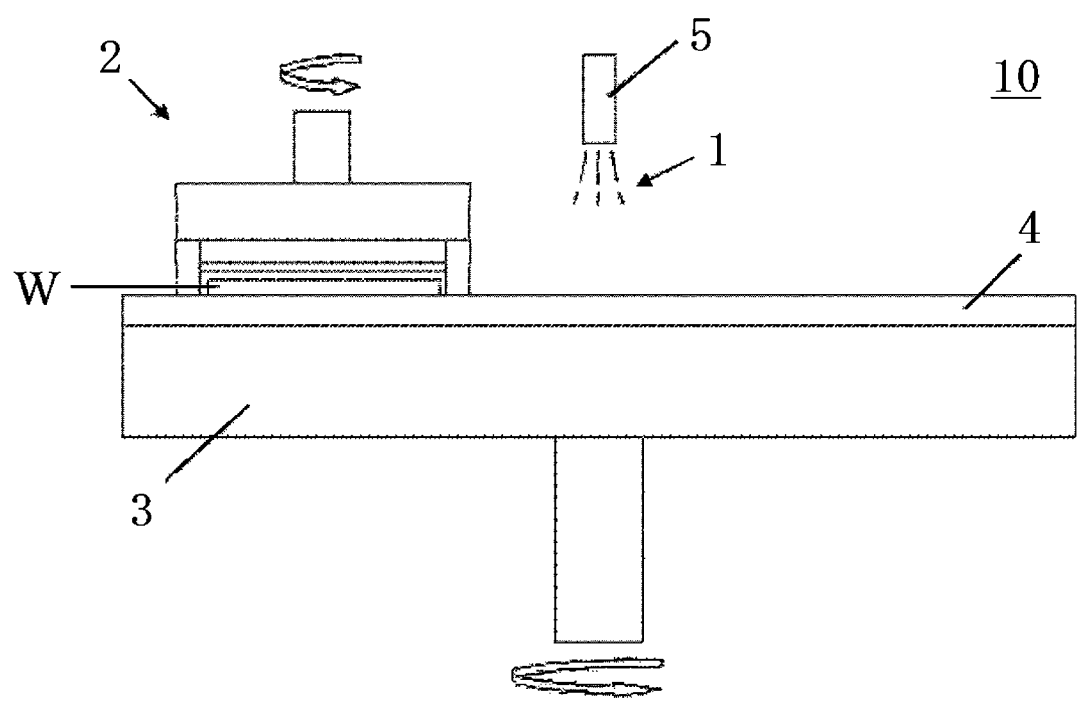

//cation (Kokai) No. 2004-98278
POLISHING AGENT FOR SYNTHETIC QUARTZ GLASS SUBSTRATE AND METHOD FOR POLISHING SYNTHETIC QUARTZ GLASS SUBSTRATE

TECHNICAL FIELD

The present invention relates to a polishing agent for a synthetic quartz glass substrate, and a method for polishing a synthetic quartz glass substrate by using the polishing agent.

BACKGROUND ART

In recent years, along with pattern miniaturization by photolithography, synthetic quartz glass substrates are required to have more stringent qualities such as defect density, defect size, surface roughness, and flatness. Above all, regarding defects on the substrates, higher quality is required as integrated circuits become finer and magnetic media have higher capacity.

In view of this, a polishing agent for a synthetic quartz glass substrate is strongly required that the quartz glass substrate after polishing should have small surface roughness, and that the quartz glass substrate should have few surface defects such as a scratch on the polished surface, so as to improve the quality of the quartz glass substrate after polishing. Moreover, in view of productivity improvement, it is also required to increase the polishing rate of the quartz glass substrate.

Conventionally, in general, a silica-based polishing agent has been studied as a polishing agent for polishing a synthetic quartz glass. Silica-based slurry is produced by subjecting silica particles to grain growth through thermal decomposition of silicon tetrachloride and adjusting pH with an alkaline solution, which contains no alkali metal such as sodium. For example, Patent Document 1 describes that defects can be reduced by using high-purity colloidal silica around neutrality. However, considering the isoelectric point of colloidal silica, colloidal silica is unstable around neutrality, and there is concern that the particle size distribution of colloidal silica abrasive grains varies during polishing, thereby bringing about a problem that the colloidal silica cannot be stably used. In addition, it is difficult to circulate and repeatedly use the polishing agent, which thus has to be disposed after one-time use, resulting in an economically unfavorable problem. Moreover, Patent Document 2 describes that defects can be reduced by using a polishing agent containing an acid and colloidal silica having an average primary particle diameter of 60 nm or less. However, these polishing agents are insufficient to satisfy current requirements, and further development is required.

Meanwhile, ceria ($CeO_2$) particles are known as a strong oxidizing agent and have chemically active characteristics. It is believed that the redox between Ce(IV) and Ce(III) of ceria is effective in improving the polishing rate of an inorganic insulator such as glass. Introducing oxygen defect by substituting part of tetravalent ceria with a different trivalent metal element can increase the reactivity with an inorganic insulator such as glass, and effectively improves the polishing rate of an inorganic insulator such as glass in comparison with colloidal silica.

However, typical ceria-based polishing agents use dry ceria particles. The dry ceria particles have irregular crystal shapes, and the application to a polishing agent results in a problem that defects such as a scratch are easily generated on the surface of the quartz glass substrate in comparison with spherical colloidal silica. Moreover, the dispersion stability of ceria-based polishing agents is lower than that of colloidal silica, causing a problem that the particles are likely to precipitate.

CITATION LIST

Patent Literature

Patent Document 1: Japanese Unexamined Patent Publication (Kokai) No. 2004-98278
Patent Document 2: Japanese Unexamined Patent Publication (Kokai) No. 2007-213020
Patent Document 3: Japanese Unexamined Patent Publication (Kokai) No. 2006-167817
Patent Document 4: Japanese Examined Patent Publication (Koukoku) No. S63-27389

SUMMARY OF INVENTION

Technical Problem

When wet ceria particles are used instead of dry ceria particles as a ceria-based polishing agent for a synthetic quartz glass substrate, defects such as a scratch are reduced more than when dry ceria particles are used, but the reduction is not sufficient to meet the requirement.

Wet ceria particles having smaller primary particle diameters can reduce defects such as a scratch. However, decreasing the primary particle diameters brings about a problem of low polishing rate.

Further, Patent Document 3 describes that the polishing rate can be accelerated by using a polishing agent which uses colloidal silica, and which contains a polymer having a sulfonic acid group, such as an acrylic acid/sulfonic acid copolymer. However, the addition of such a polymer to a ceria-based polishing agent is still insufficient to achieve the currently required polishing rate, and further improvement of the polishing rate is required.

Furthermore, Patent Document 4 describes that the polishing rate can be accelerated by using a polishing agent containing 0.5 to 60% by mass of at least one of rare earth elements selected from the group consisting of cerium, lanthanide, and yttrium. However, the oxide particles obtained in Patent Document 4 have an average particle diameter of 0.5 to 1.7 μm. This particle size is so large that the polished synthetic quartz glass substrate has a problem in surface accuracy.

The present invention has been accomplished in view of the problems as described above. An object of the present invention is to provide a polishing agent for a synthetic quartz glass substrate, the polishing agent having high polishing rate and being capable of sufficiently reducing generation of defects due to polishing.

Solution to Problem

To achieve the object, the present invention provides a polishing agent for a synthetic quartz glass substrate, the polishing agent comprising:
  wet ceria particles; and
  non-spherical silica particles, wherein
  the wet ceria particles have an average primary particle diameter of 30 nm to 50 nm, and
  the non-spherical silica particles have an average primary particle diameter of 80 nm to 120 nm.

The polishing agent containing such particles is a polishing agent for a synthetic quartz glass substrate, the polishing agent having high polishing rate and being capable of sufficiently reducing generation of defects due to polishing.

In this case, preferably, the wet ceria particles have a degree of association of 1.0 to 3.0, and the non-spherical silica particles are associated silica particles and have a degree of association of 2.0 to 3.5.

The polishing agent containing such particles is a polishing agent for a synthetic quartz glass substrate, which generates fewer defects such as a scratch by polishing and has more favorable polishing rate.

Moreover, a content of the wet ceria particles in the polishing agent is preferably 1.5 times to 3.0 times as high as a content of the non-spherical silica particles in a mass ratio.

When the wet ceria particles and the non-spherical silica particles are incorporated in such a mass ratio, the polishing agent for a synthetic quartz glass substrate has sufficient polishing ability.

Further, a total content of the wet ceria particles and the non-spherical silica particles in the polishing agent is preferably 20 parts by mass to 50 parts by mass per 100 parts by mass of the polishing agent.

The polishing agent containing such contents of the wet ceria particles and the non-spherical silica particles is more suitably usable as a polishing agent for a synthetic quartz glass substrate.

Furthermore, the present invention provides a method for polishing a synthetic quartz glass substrate, comprising a rough polishing step and a final polishing step after the rough polishing step, wherein the inventive polishing agent for a synthetic quartz glass substrate is used in the final polishing step for final polishing.

Such a polishing method using the inventive polishing agent for a synthetic quartz glass substrate enables high polishing rate and can inhibit generation of defects due to polishing.

Advantageous Effects of Invention

As ceria particles having high polishing rate for glass are mixed with silica particles having smooth surfaces and enabling few defect and highly smooth polishing, high polishing rate is achieved with few defects. The wet ceria having smaller particle diameters can inhibit defect generation due to polishing. Even though decreasing the ceria particle diameters decreases the reactivity with glass and hence the polishing rate, these decreases can be suppressed by mixing silica particles which generate few defects even with large particle diameters. Consequently, higher polishing rate is achieved. In addition, the silica particles to be mixed have non-spherical shape, so that when the silica particles are used, the warped shape in comparison with spherical silica particles decreases the contact area of the particles with a substrate, and resembles point contact. This makes it possible to increase the force transferred to the substrate during polishing, thereby improving the polishing ability.

As has been described above, the inventive polishing agent for a synthetic quartz glass substrate and the polishing method using the polishing agent enable sufficient polishing rate and sufficient inhibition of defect generation on the surface of a synthetic quartz glass substrate. As a result, the productivity and yield can be improved in producing synthetic quartz glass substrates. Moreover, by using the inventive polishing agent for a synthetic quartz glass substrate, finer semiconductor devices can be obtained.

BRIEF DESCRIPTION OF DRAWINGS

FIG. 1 is a schematic diagram showing an example of a polishing apparatus usable in a method for polishing a synthetic quartz glass substrate of the present invention.

DESCRIPTION OF EMBODIMENTS

As described above, there have been demands for the development of a polishing agent for a synthetic quartz glass substrate, the polishing agent having high polishing rate and being capable of sufficiently reducing generation of defects due to polishing.

The present inventor and colleagues have earnestly studied the above problems and consequently found that a polishing agent containing wet ceria particles and non-spherical silica particles having predetermined average primary particle diameters can achieve high polishing rate for synthetic quartz glass substrates, and can polish synthetic quartz glass substrates with few defects. This finding has led to the present invention.

Specifically, the present invention is a polishing agent for a synthetic quartz glass substrate, the polishing agent comprising:
  wet ceria particles; and
  non-spherical silica particles, wherein
  the wet ceria particles have an average primary particle diameter of 30 nm to 50 nm, and
  the non-spherical silica particles have an average primary particle diameter of 80 nm to 120 nm.

Hereinafter, embodiments of the present invention will be described, but the present invention is not limited thereto limited.

As described above, in the inventive polishing agent for a quartz glass substrate (hereinafter also simply referred to as "polishing agent"), polishing particles are mixed particles of wet ceria particles and non-spherical silica particles.

The inventive polishing agent for a synthetic quartz glass substrate uses such mixed particles of wet ceria particles and non-spherical silica particles as the polishing particles, and thereby inhibits generation of defects such as damage due to polishing and enables polishing at high polishing rate.

Hereinbelow, detailed explanation is given for the components, components that can be optionally added, and polishing a synthetic quartz glass substrate with the inventive polishing agent.

As described above, the inventive polishing agent for a quartz glass substrate contains wet ceria particles and non-spherical silica particles.

Generally, silica particles are used in final polishing of a synthetic quartz glass substrate. This is because a highly smooth surface with few defects can be obtained owing to the smooth surfaces in comparison with wet ceria particles. However, since silica particles, unlike wet ceria particles, have low reactivity with glass, the polishing rate is low, and silica particles cannot be described as polishing abrasive grains with a high polishing ability.

Alternatively, it is possible to improve polishing ability by using wet ceria particles having high reactivity with glass. Nevertheless, defects such as a scratch are likely to be generated by the polishing in comparison with silica particles. Although decreasing the diameters of wet ceria particles can reduce defects, decreasing the particle diameters also decreases the reactivity with glass and decreases the polishing rate, too.

Thus, the use of the polishing agent mixed with silica particles having large particle diameters makes it possible to reduce defect generation and enables polishing at a higher polishing rate than when the wet ceria particles or the silica particles are used alone.

Further, when associated non-spherical silica particles are used as the silica particles, the contact area between the silica particles and a glass substrate is small and resembles point contact. Thus, greater force can be transferred to the glass substrate, and the polishing ability can be further improved.

The wet ceria particles contained in the inventive polishing agent have an average primary particle diameter of 30 nm to 50 nm, and the non-spherical silica particles have an average primary particle diameter of 80 nm to 120 nm. The average primary particle diameter of the non-spherical silica particles is larger than the average primary particle diameter of the wet ceria particles.

By preparing the wet ceria particles having smaller particle diameters than the non-spherical silica particles, the wet ceria particles enter pores in a packed structure in a unit volume constituted of the non-spherical silica particles, and can increase the packing fraction per unit volume, so that the polishing ability can be improved.

As mentioned above, the wet ceria particles have an average primary particle diameter of 30 nm to 50 nm. The average primary particle diameter is preferably 35 nm to 50 nm, particularly preferably 40 nm to 50 nm. If the average primary particle diameter of the wet ceria particles is smaller than 30 nm, the reactivity of the wet ceria particles with glass is significantly lowered, and the ability to polish quartz glass is significantly lowered. Meanwhile, if the average primary particle diameter is larger than 50 nm, the number of defects such as a scratch due to polishing is increased, and fewer pores formed by the silica particles are filled. Hence, there is a problem that the rate of polishing a quartz glass is not improved.

Moreover, as mentioned above, the non-spherical silica particles have an average primary particle diameter of 80 nm to 120 nm. The average primary particle diameter is preferably 80 nm to 110 nm, more preferably 90 nm to 110 nm. If the average primary particle diameter of the non-spherical silica particles is smaller than 80 nm, the shapes become spherical or so, so that the polishing ability of the silica particles per se is not improved, and the polishing rate is consequently lowered. Meanwhile, if the average primary particle diameter is larger than 120 nm, the dispersibility of the silica particles is lowered, causing a problem of particle precipitation.

Herein, the degree of association of the wet ceria is preferably 3.0 or less, more preferably 1.0 to 3.0. When the wet ceria particles have a degree of association in this range, the number of defects such as a scratch caused by polishing is small. Moreover, the pores formed by the silica particles are filled, so that the rate of polishing a quartz glass is improved.

Further, the degree of association of the silica particles is preferably 2.0 or more, more preferably 2.0 to 3.5. When the silica particles have a degree of association of 2.0 or more, the shapes are kept non-spherical. This eliminates the concerns that the polishing ability of the silica particles per se is not improved and the polishing rate is lowered.

Note that the term degree of association used herein refers to a value of: degree of association=average secondary particle diameter/average primary particle diameter. The average primary particle diameter is one calculated as an equivalent circle diameter from an image obtained by transmission electron microscope measurement. The average secondary particle diameter is one determined by scattering intensity measurement in dynamic light scattering with a red laser.

The wet ceria particles is mixed in the inventive polishing agent such that a mixing ratio (content) thereof is preferably 1.0 times to 4.0 times, more preferably 1.5 times to 3.0 times, as high as that of the non-spherical silica particles in a mass ratio. When the mixing ratio of the wet ceria particles is 1.0 times or more as high as that of the non-spherical silica particles, the ability to polish quartz glass is not lowered, and the polishing rate is not lowered. Moreover, when the mixing ratio is 4.0 times or less, the small wet ceria particles do not dominate, so that sufficient polishing ability is obtained.

Further, a total content of the wet ceria particles and the non-spherical silica particles is preferably 20 to 50 parts by mass per 100 parts by mass of the polishing agent. Within this range, there is no concern that the polishing rate is lowered.

The wet ceria particles contained in the inventive polishing agent are not particularly limited, but are preferably produced by a wet precipitation method in which a cerium salt as a precursor substance and a basic solution are mixed and heated.

As a method for producing the wet ceria particles, first, a cerium salt as a precursor is mixed with ultrapure water to produce a cerium aqueous solution. The cerium salt and ultrapure water can be mixed at a ratio of, for example, 2:1 to 4:1. Here, as the cerium salt, at least one of a Ce(III) salt and a Ce(IV) salt can be utilized. Specifically, at least one Ce(III) salt may be mixed with ultrapure water, or at least one Ce(IV) salt may be mixed with ultrapure water, or at least one Ce(III) salt and at least one Ce(IV) salt may be mixed with ultrapure water. As the Ce(III) salt, cerium chloride, cerium fluoride, cerium sulfate, cerium nitrate, cerium carbonate, cerium perchlorate, cerium bromide, cerium sulfide, cerium iodide, cerium oxalate, cerium acetate, and the like can be mixed. As the Ce(IV) salt, cerium sulfate, ammonium cerium nitrate, cerium hydroxide, and the like can be mixed. Among these, cerium nitrate is suitably used as the Ce(III) salt, and ammonium cerium nitrate is suitably used as the Ce(IV) salt, in terms of ease of use.

Further, an acidic solution may be mixed to stabilize the cerium aqueous solution produced by mixing with ultrapure water. Here, the acidic solution and the cerium solution can be mixed at a ratio of 1:1 to 1:100. Examples of the usable acid solution here include hydrogen peroxide, nitric acid, acetic acid, hydrochloric acid, sulfuric acid, and the like. The cerium solution mixed with the acid solution may be adjusted to have a pH of, for example, 0.01.

Separately from the cerium solution, a basic solution is produced. As the basic solution, ammonia, sodium hydroxide, potassium hydroxide, and the like can be used, and these are mixed with ultrapure water for dilution to an appropriate concentration before use. As the dilution ratio, the basic substance can be diluted with ultrapure water at a ratio of 1:1 to 1:100. The diluted basic solution may be adjusted to have a pH of, for example, 11 to 13.

Next, the diluted basic solution is transferred to a reaction vessel, and then stirred for, for example, 5 hours or less under an inert gas atmosphere such as nitrogen, argon, or helium. Subsequently, the diluted basic solution is mixed with the cerium aqueous solution at a rate of, for example, 0.1 L/sec or more. Then, a heat treatment is performed at a predetermined temperature. In this event, the heat treatment can be performed at a heat treatment temperature of 100° C. or less, for example, 60° C. or more and 100° C. or less. The heat treatment time may be 2 hours or more, for example, 2 hours to 10 hours. Moreover, as the heating rate from normal temperature to the heat treatment temperature, the temperature may be increased at a rate of 0.2° C. to 1° C. per minute, preferably 0.5° C. per minute.

The mixed solution having been subjected to the heat treatment is cooled to room temperature. Through such treatments, a mixed solution is produced in which wet ceria particles having primary particle diameters of, for example, 100 nm or less are generated.

As described above, a mixed solution of the precursor aqueous solution of a cerium salt with the diluted basic solution is heated at a heat treatment temperature within an appropriate range by increasing the temperature at an appropriate heating rate. Thereby, the cerium salt in the mixed solution reacts during the heating process, and fine nuclei of ceria ($CeO_2$) are generated. Then, crystals grow around these fine nuclei, so that 5-nm to 100-nm crystal particles of wet ceria particles are produced. The crystal particles may be classified by filtration or the like, so that wet ceria particles having an average primary particle diameter of 30 nm to 50 nm used in the present invention can be obtained.

As the non-spherical silica particles contained in the inventive polishing agent, it is possible to use a commercially available colloidal solution in which non-spherical silica particles are dispersed. For example, PL series manufactured by Fuso Chemical Co., Ltd., and the like can be suitably used.

The inventive polishing agent may contain an additive to adjust the polishing characteristics. Such an additive includes amino acids and anionic surfactants that can change the surface potential of the polishing particles to negative. When the surface potential of the ceria particles is made negative, the particles easily disperse in the polishing agent and do not easily generate secondary particles having large particle diameters, so that generation of polishing damage can be further inhibited.

Examples of the anionic surfactants serving as the additive include monoalkyl sulfate, alkylpolyoxyethylene sulfate, alkylbenzene sulfonate, monoalkyl phosphate, lauryl sulfate, polycarboxylic acid, polyacrylate, polymethacrylate, and the like. Examples of the amino acids include arginine, lysine, aspartic acid, glutamic acid, asparagine, glutamine, histidine, proline, tyrosine, serine, tryptophan, threonine, glycine, alanine, methionine, cysteine, phenylalanine, leucine, valine, isoleucine, and the like.

Regarding the concentration when these additives are used, the content is preferably in a range of 0.001 parts by mass to 0.05 parts by mass based on 1 part by mass of the polishing particles. More preferably, the content is more preferably in a range of 0.005 parts by mass to 0.02 parts by mass. When the content is 0.001 parts by mass or more relative to 1 part by mass of the polishing particles, the mixed particles in the polishing agent more stably disperse and do not easily form aggregated particles having large particle diameters. Moreover, when the content is 0.05 parts by mass or less relative to 1 part by mass of the polishing particles, the additive does not impede polishing, and can prevent a reduction in the polishing rate. Therefore, the additive contained in the above range can further improve the dispersion stability of the polishing agent while preventing the reduction in the polishing rate.

The inventive polishing agent preferably has a pH within a range of 3.0 or more and 8.0 or less in view of excellent storage stability and polishing rate of the polishing agent. When the pH is 3.0 or more, the wet ceria stably disperse in the polishing agent. When the pH is 8.0 or less, the polishing rate can be more improved. Moreover, the lower limit of preferable pH range is more preferably 4.0 or more, particularly preferably 6.0 or more. Meanwhile, the upper limit of preferable pH range is preferably 8.0 or less, more preferably 7.0 or less. Further, the pH of the polishing agent can be adjusted by adding: an inorganic acid such as hydrochloric acid, nitric acid, sulfuric acid, or phosphoric acid; an organic acid such as formic acid, acetic acid, citric acid, or oxalic acid; ammonia, sodium hydroxide, potassium hydroxide, tetramethylammonium hydroxide (TMAH), or the like.

Next, a method for polishing a synthetic quartz glass substrate by using the inventive polishing agent will be described. The inventive polishing agent is particularly preferably used in a final polishing step after a rough polishing step. Accordingly, the description will be given by taking, as an example, a case of performing single-side polishing in a final polishing step. However, it is a matter of course that the present invention is not limited thereto, and the inventive polishing agent can also be used for rough polishing. Moreover, the inventive polishing agent can be used not only for single-side polishing, but also for double-side polishing or the like.

A single-side polishing apparatus usable in the inventive polishing method can be, for example, a single-side polishing apparatus 10 that includes a turn table 3 to which a polishing pad 4 is attached, a polishing agent supply mechanism 5, a polishing head 2, and so forth as shown in FIG. 1. Moreover, as shown in FIG. 1, the polishing head 2 can rotate and hold a synthetic quartz glass substrate W to be polished. Further, the turn table 3 can also rotate. For the polishing pad 4, nonwoven fabric, foamed polyurethane, porous resins, or the like can be used. Further, since the surface of the polishing pad 4 is preferably always covered with a polishing agent 1 during polishing, the polishing agent supply mechanism 5 is preferably provided with a pump or the like to supply the polishing agent 1 successively. In the single-side polishing apparatus 10 as described above, the polishing head 2 holds the synthetic quartz glass substrate W, and the polishing agent supply mechanism 5 supplies the inventive polishing agent 1 onto the polishing pad 4. Then, the turn table 3 and the polishing head 2 are each rotated to bring the surface of the synthetic quartz glass substrate W into sliding contact with the polishing pad 4 for polishing. Such a polishing method using the inventive polishing agent can accelerate the polishing rate and inhibit generation of defects due to polishing. Moreover, the inventive polishing method can provide a synthetic quartz glass substrate having significantly fewer defects and thus is suitably utilizable for final polishing.

Particularly, a synthetic quartz glass substrate subjected to the final polishing by the inventive polishing method can be used for semiconductor-related electronic materials (particularly, semiconductor-related electronic materials for cutting-edge application), and can be suitably used for photomask, nanoimprinting, and magnetic devices. Note that a synthetic quartz glass substrate before finish polishing can be prepared, for example, by the following procedure. First, a synthetic quartz glass ingot is formed, and then the synthetic quartz glass ingot is annealed. Next, the synthetic quartz glass ingot is sliced into wafers. Subsequently, the sliced wafers are chamfered and then lapped. Thereafter, the surface of each wafer is polished to a mirror finish. After that, the synthetic quartz glass substrate thus prepared can be subjected to final polishing by the inventive polishing method.

EXAMPLE

Hereinafter, the present invention will be specifically described with reference to Examples and Comparative Examples. However, the present invention is not limited thereto.

Example 1

An aqueous dispersion of wet ceria particles having an average primary particle diameter of 40 nm calculated with a transmission electron microscope and an average secondary particle diameters of 90 nm determined by scattering intensity measurement in dynamic light scattering (degree of association: 2.3) was mixed with an aqueous dispersion of non-spherical silica particles (PL-10H manufactured by Fuso Chemical Co., Ltd.) having an average primary particle diameter of 90 nm and an average secondary particle diameter of 220 nm (degree of association: 2.4) such that the mixing ratio of the wet ceria particles was 2 times as high as that of the non-spherical silica particles. Thus, a polishing agent was prepared which had a particle concentration of 40 parts by mass.

A polishing pad (made of soft suede/manufactured by FILWEL Co., Ltd.) was attached to a turn table. To a substrate-mountable head, a synthetic quartz glass substrate (4 inches: 100 mm) after rough polishing was set. Then, the synthetic quartz glass substrate was polished by 2 μm or more, which is enough to remove the defects generated in the rough polishing step, while the above polishing agent for polishing a synthetic quartz glass substrate was being supplied at 100 ml per minute. Here, the polishing load was 100 gf/cm$^2$, and the rotation speeds of the turn table and the head were 50 rpm. After the polishing, the synthetic quartz glass substrate was taken from the head, washed with pure water, further subjected to ultrasonic cleaning, and then dried at 80° C. with a drier. The change in thickness of the synthetic quartz glass substrate before and after the polishing was measured with a reflection spectroscopic film thickness monitor (SF-3 manufactured by OTSUKA Electronics Co., Ltd.) to calculate the polishing rate. In addition, the number of defects of 100 nm or larger generated on the polished surface of the synthetic glass substrate was counted with a laser microscope.

Example 2

An aqueous dispersion of wet ceria particles having an average primary particle diameter of 30 nm calculated with a transmission electron microscope and an average secondary particle diameters of 55 nm determined by scattering intensity measurement in dynamic light scattering (degree of association: 1.8) was mixed with an aqueous dispersion of non-spherical silica particles (PL-10H manufactured by Fuso Chemical Co., Ltd.) having an average primary particle diameter of 90 nm and an average secondary particle diameter of 220 nm (degree of association: 2.4) such that the mixing ratio of the wet ceria particles was 1.5 times as high as that of the non-spherical silica particles. Thus, a polishing agent was prepared which had a particle concentration of 40 parts by mass. A synthetic quartz glass substrate was polished therewith by the same procedure as in Example 1.

Example 3

A synthetic quartz glass substrate was polished by the same procedure as in Example 1, except for using wet ceria particles having an average primary particle diameter of 50 nm and an average secondary particle diameter of 110 nm (degree of association: 2.2).

Examples 4 to 6

Synthetic quartz glass substrates were polished by the same procedure as in Example 1, except for using non-spherical silica particles having an average primary particle diameter of 80 nm, 100 nm, or 120 nm. Note that the average secondary particle diameters and the degrees of association of the non-spherical silica particles in the respective examples were 180 nm (degree of association: 2.2), 260 nm (degree of association: 2.6), and 340 nm (degree of association: 2.8).

Comparative Examples 1 and 2

Synthetic quartz glass substrates were polished by the same procedure as in Example 1, except for using wet ceria particles having an average primary particle diameter of 20 nm or 60 nm, respectively. Note that the average secondary particle diameters and the degrees of association of the wet ceria particles in the respective examples were 70 nm (degree of association: 3.5) and 190 nm (degree of association: 3.2).

Comparative Examples 3 and 4

Synthetic quartz glass substrates were polished by the same procedure as in Example 1, except for using non-spherical silica particles having an average primary particle diameter of 70 nm or 130 nm. Note that the average secondary particle diameters and the degrees of association of the non-spherical silica particles in the respective examples were 140 nm (degree of association: 2.0) and 390 nm (degree of association: 3.0).

Comparative Example 5

A synthetic quartz glass substrate was polished by the same procedure as in Example 1, except that silica particles (COMPOL 120 manufactured by Fujimi Incorporated), which are spherical silica particles having an average primary particle diameter of 80 nm and an average secondary particle diameter of 130 nm (degree of association: 1.6), were used instead of the non-spherical silica particles.

Comparative Example 6

A synthetic quartz glass substrate was polished by the same procedure as in Example 1, except that the polishing agent used was an aqueous dispersion in which 40 parts by mass of wet ceria particles having an average primary particle diameter of 50 nm and an average secondary particle diameters of 110 nm (degree of association: 2.2) were dispersed.

Comparative Example 7

A synthetic quartz glass substrate was polished by the same procedure as in Example 1, except that the polishing agent used was an aqueous dispersion in which 20 parts by mass of non-spherical silica particles having an average primary particle diameter of 90 nm and a degree of association of 2.4 were dispersed.

Table 1 shows the results of Examples and Comparative Examples described above. Note that the numbers in the table each indicate an average value of five synthetic quartz glass substrates polished in each Example and Comparative Example.

TABLE 1

|  | Wet ceria particles | | Silica particles | | Wet ceria content/ silica particle content | Particle concentration (parts by mass) | Polishing rate (µm/hr) | Defect (number) |
|---|---|---|---|---|---|---|---|---|
|  | average primary particle diameter (nm) | degree of association | average primary particle diameter (nm) | degree of association | | | | |
| Example 1 | 40 | 2.3 | 90 | 2.4 | 2 | 40 | 2.0 | 1 |
| Example 2 | 30 | 1.8 | 90 | 2.4 | 1.5 | 40 | 1.8 | 0 |
| Example 3 | 50 | 2.2 | 90 | 2.4 | 2 | 40 | 3.0 | 1 |
| Example 4 | 40 | 2.3 | 80 | 2.2 | 2 | 40 | 1.9 | 1 |
| Example 5 | 40 | 2.3 | 100 | 2.6 | 2 | 40 | 2.8 | 1 |
| Example 6 | 40 | 2.3 | 120 | 2.8 | 2 | 40 | 3.0 | 1 |
| Comparative Example 1 | 20 | 3.5 | 90 | 2.4 | 2 | 40 | 0.5 | 0 |
| Comparative Example 2 | 60 | 3.2 | 90 | 2.4 | 2 | 40 | 3.5 | 20 |
| Comparative Example 3 | 40 | 2.3 | 70 | 2.0 | 2 | 40 | 0.8 | 1 |
| Comparative Example 4 | 40 | 2.3 | 130 | 3.0 | 2 | 40 | 1.0 | 5 |
| Comparative Example 5 | 40 | 2.3 | 80 | 1.6 | 2 | 40 | 0.1 | 1 |
| Comparative Example 6 | 50 | 2.2 | — | — | — | 40 | 1.0 | 10 |
| Comparative Example 7 | — | — | 90 | 2.4 | — | 20 | 0.3 | 0 |

The generation of defects due to polishing was successfully inhibited when the synthetic quartz glass substrates were polished using the polishing agents obtained in Examples 1 to 6, i.e., polishing agents containing wet ceria particles and non-spherical silica particles having predetermined average primary particle diameters. Further, high polishing rates were obtained for the synthetic quartz glass substrates. In contrast, in Comparative Examples 1 to 4, in which the polishing agents containing wet ceria particles or non-spherical silica particles not having the average primary particle diameters defined in the present invention were used, many defects were generated, or the polishing rates were low. The results were inferior to those of Examples. Moreover, in Comparative Example 5, in which the spherical silica particles were used instead of the non-spherical silica particles, the generation of defects was inhibited, but the polishing rate was low. Further, in Comparative Example 6 containing no non-spherical silica particles, the number of defects was large. In Comparative Example 7 containing no wet ceria particles, the polishing rate was low.

As has been described above, it can be understood that when a synthetic quartz glass substrate is polished using the inventive polishing agent for a synthetic quartz glass substrate, high polishing rate is achieved for the synthetic quartz glass substrate, and the synthetic quartz glass substrate can be polished with few defects generated on the polished surface.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

The invention claimed is:

1. A polishing agent for a synthetic quartz glass substrate, the polishing agent comprising:
   wet ceria particles; and
   non-spherical silica particles, wherein
   the wet ceria particles have an average primary particle diameter of 30 nm to 50 nm,
   the non-spherical silica particles have an average primary particle diameter of 80 nm to 120 nm,
   the wet ceria particles have a degree of association of 1.0 to 3.0,
   the non-spherical silica particles are associated silica particles and have a degree of association of 2.0 to 3.5,
   a content of the wet ceria particles in the polishing agent is 1.5 times to 3.0 times as high as a content of the non-spherical silica particles in a mass ratio, and
   a total content of the wet ceria particles and the non-spherical silica particles in the polishing agent is more than 20 parts by mass to 50 parts by mass per 100 parts by mass of the polishing agent.

2. A method for polishing a synthetic quartz glass substrate, comprising a rough polishing step and a final polishing step after the rough polishing step, wherein the polishing agent for a synthetic quartz glass substrate according to claim 1 is used in the final polishing step for final polishing.

3. The method according to claim 2, wherein the total content of the wet ceria particles and the non-spherical silica particles in the polishing agent is 40 parts by mass to 50 parts by mass per 100 parts by mass of the polishing agent.

4. The polishing agent according to claim 1, wherein the total content of the wet ceria particles and the non-spherical silica particles in the polishing agent is 40 parts by mass to 50 parts by mass per 100 parts by mass of the polishing agent.

* * * * *